June 15, 1937.  A. J. KEMPIEN  2,084,202
ELECTRICAL INDICATOR
Original Filed Dec. 30, 1929  5 Sheets-Sheet 1
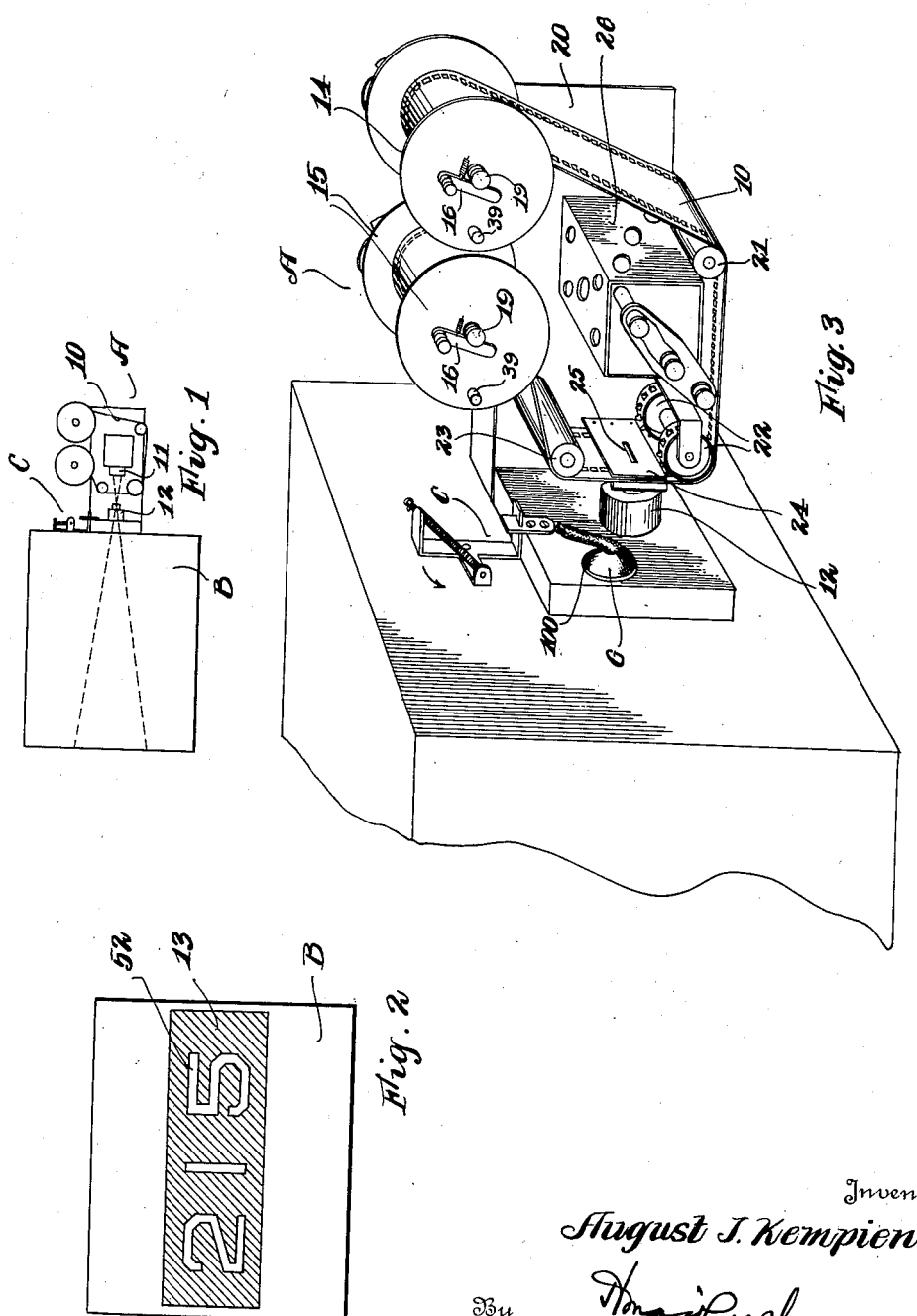
Inventor
August J. Kempien
By
Attorney

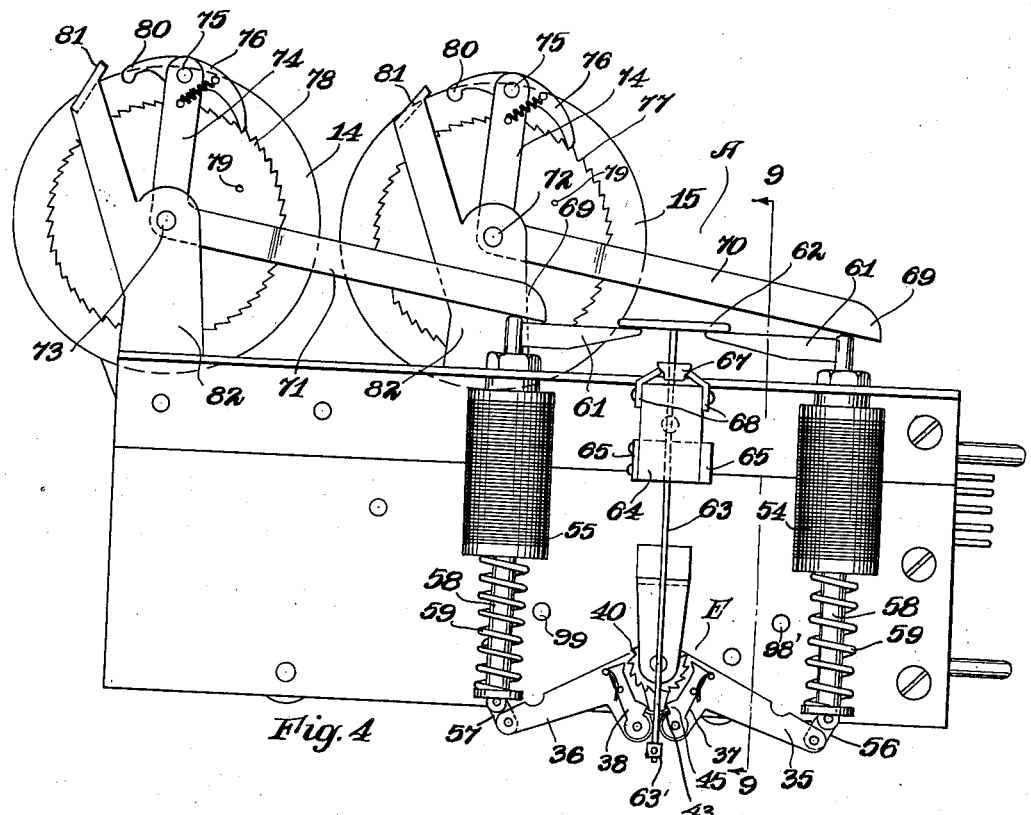

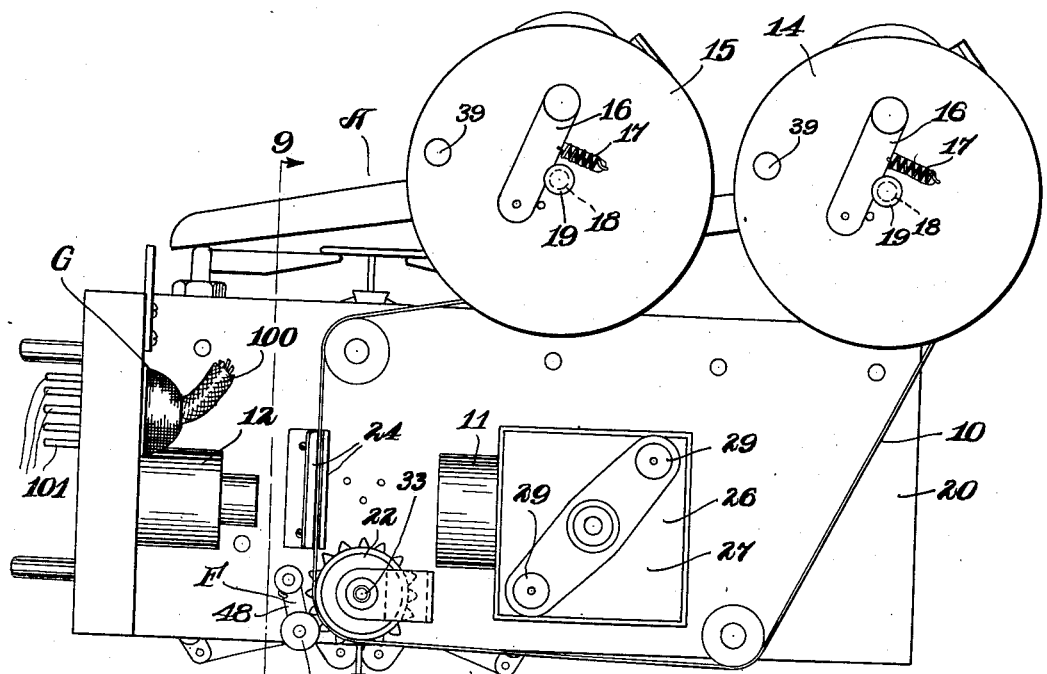
Fig. 6
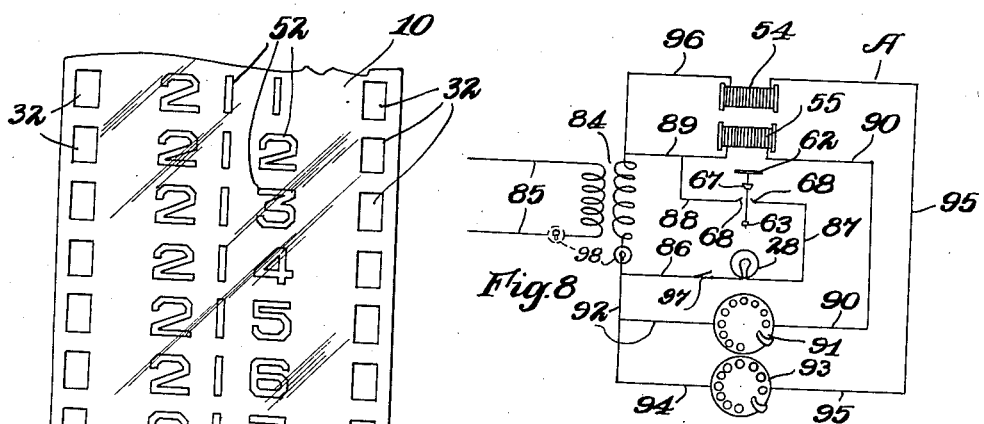
Fig. 7
Fig. 8
Inventor
August J. Kempien
By
Attorney

June 15, 1937.  A. J. KEMPIEN  2,084,202
ELECTRICAL INDICATOR
Original Filed Dec. 30, 1929  5 Sheets-Sheet 4

Inventor
August J. Kempien
By
Attorney

June 15, 1937.  A. J. KEMPIEN  2,084,202
ELECTRICAL INDICATOR
Original Filed Dec. 30, 1929  5 Sheets-Sheet 5
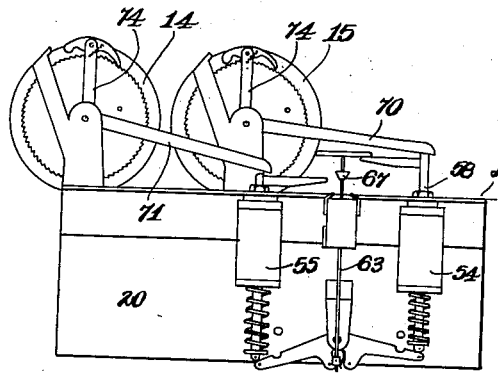
Fig. 12
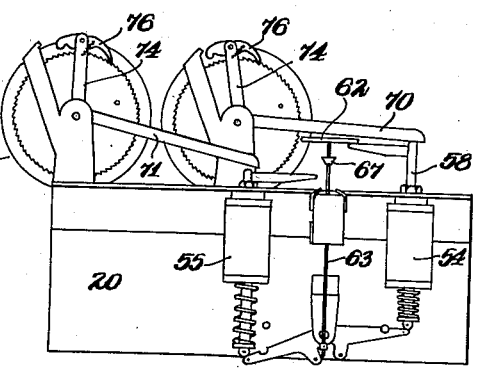
Fig. 13
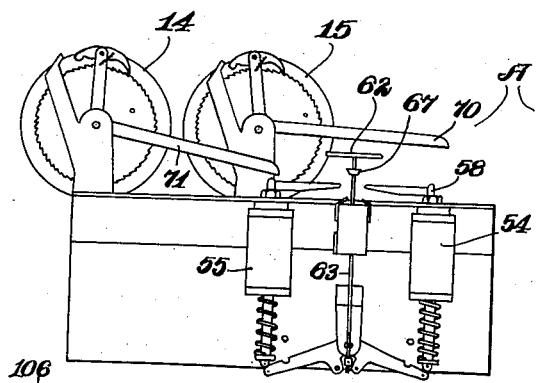
Fig. 14
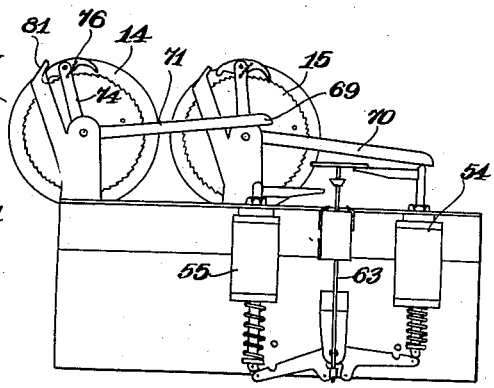
Fig. 15
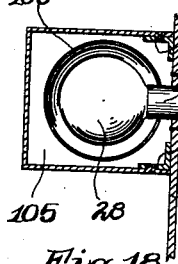
Fig. 18
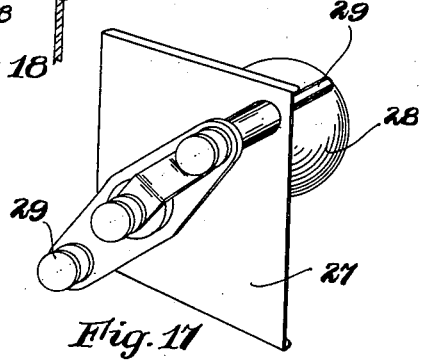
Fig. 17
Fig. 16
Inventor
August J. Kempien
By
Attorney Patented June 15, 1937

2,084,202

UNITED STATES PATENT OFFICE 2,084,202

ELECTRICAL INDICATOR

August J. Kempien, St. Paul, Minn.

Application December 30, 1929, Serial No. 417,354
Renewed May 8, 1937

12 Claims. (Cl. 177—338)

My invention relates to an electrical indicator designed to be used to indicate numbers, signs, signals, scores or illustrations, in a visible manner including an automatically operated electrical selecting means. Bowling and other games such as basketball may be indicated by my indicator, or it may be used as an elevator signal, time or calendar signal, or to display market quotations.

A feature of the invention resides in means for projecting the number or illustration to be indicated so that the same may be shown in the size desired upon a suitable screen or translucent member upon which the number is focused. The projection is through electric impulses automatically controlled by electrically operated means to indicate quickly the selected number or signal to provide virtually a silent call or indicating means adaptable for use in factories, hospitals, hotels, and other institutions where it is desirable to locate or call individuals or persons or to indicate certain selected illustrations or scores.

In hospitals where quietness is usually required for the benefit of the patients, the use of my indicator forms a primary means of locating the doctor, nurse, or interne, and the indicator is applicable to numbers, signs, signals, which primarily are of a visible nature and which may be changed to silently yet clearly indicate the sign, signal or number desired.

It is a feature to provide a master indicator such as a roll film, and in electrically operating the same into the various positions desired I provide take-up mechanism which includes ratchet and counter-weight means operable in either direction to take up any slack that may occur in the film, together with automatic means for setting the film in the desired position to overcome any variation in the expansion or contraction of the same or the varying position of the master indicators in relation to the projecting means.

The projecting mechanism of my indicator is of a compact nature designed to be readily replaced by a similar projecting mechanism, should it be desired, suitable latch means holding the unit in operative position so that it will project the signs or signals on the indicator. This projecting means includes a simple and effective self-locking device for keeping the film spools in place, together with guide means for guiding the film into position in relation to the projecting light and lens. I have provided a peculiarly different means than is employed for any other purpose, insofar as I know, for operating the film in the direction desired which includes means for engaging directly with the film which co-operates with the means for registering the indicator on the film with the projecting lens and opening and which overcomes the inertia in the movement of the film, together with holding the film against the feeding mechanism. The electrical impulse means carries the film a step at a time and this is designed to operate very rapidly, and thus the film with the indicating configuration or data is carried rapidly to position to indicate a certain signal or sign on the visible screen. The screen for indicating may be placed in such a manner so that only that portion of the screen upon which the indication is to be illustrated or shown is apparent to the observer, while the unit and all of the operating mechanism is concealed, and thereby providing an attractive electrical indicator to provide a silent signal or call.

A feature of the projecting mechanism resides in means for turning off the light automatically during the movement of the film which projects the signal to the indicating screen. This overcomes any flickering and keeps the screen blank until the desired signal or call appears upon the same. In this manner I provide a very effective electrical signal means. The ratchet operation of the electrical means for moving the film in the desired direction is such as to make the movement of the film virtually continuous when once it is started to be moved in a particular direction until it reaches the position desired. Associated with the electrical means for operating the film is the switch which operates the indicating light and by a peculiar means which retards the turning on of the switch I accomplish this result of keeping the screen dark until the movement of the film ceases. In this manner I can indicate from a high to a low number or vice versa, or from one indicator to another in virtually a few seconds.

My indicator is designed in a unit so that it may be substituted for a similar unit or parts of the unit may be substituted for other similar parts when it is desired, and the film may be quickly removed and another film put in its place. By arranging the projector and operating mechanism of my indicator in a unit I provide means so that a series of units may be used collectively or separately for any desired purpose, and each unit operated separately by a master control, or the units may be co-ordinated together so as to operate with each other. Each unit includes a locking means for preventing the unrolling of the film together with an automatic release which permits the film to unroll on either of the supply spools when desired.

These features, together with other details and objects of the invention and the peculiar arrangement of the parts which are associated together to accomplish certain defined functions of a nature which I believe are entirely distinctive and different than any other indicating means, insofar as I know, will be more fully and clearly set forth throughout the specification and claims.

In the drawings forming part of my specification:

Figure 1 is a small side view of my electrical indicator.

Figure 2 is a front view of the screen of the same.

Figure 3 is a perspective of a portion of my indicator showing one of the operating units.

Figure 4 is an enlarged side view of one of the operating units removed from the screen cabinet.

Figure 5 is a plan view of the operating unit.

Figure 6 is a side view in the opposite direction to Figure 4.

Figure 7 illustrates an enlarged segmental portion of the master or indicating film.

Figure 8 is a diagrammatic illustration of the wiring for my operating unit.

Figure 12 is a diagrammatic side view of the unit to indicate operation of the film in one direction.

Figure 13 is a similar view to Figure 12 with the progression of operation slightly further than that of Figure 12.

Figure 14 illustrates a further progression similar to Figures 12 and 13 in the operation of the film by the solenoid.

Figure 15 illustrates another position of the parts of the unit in operation.

Figure 16 is a perspective of the projecting light compartment showing the light removed therefrom.

Figure 17 is a perspective view of the projecting light with its carrying plate and switch means.

Figure 18 is a sectional view through an alternate form of light compartment.

Figure 9:
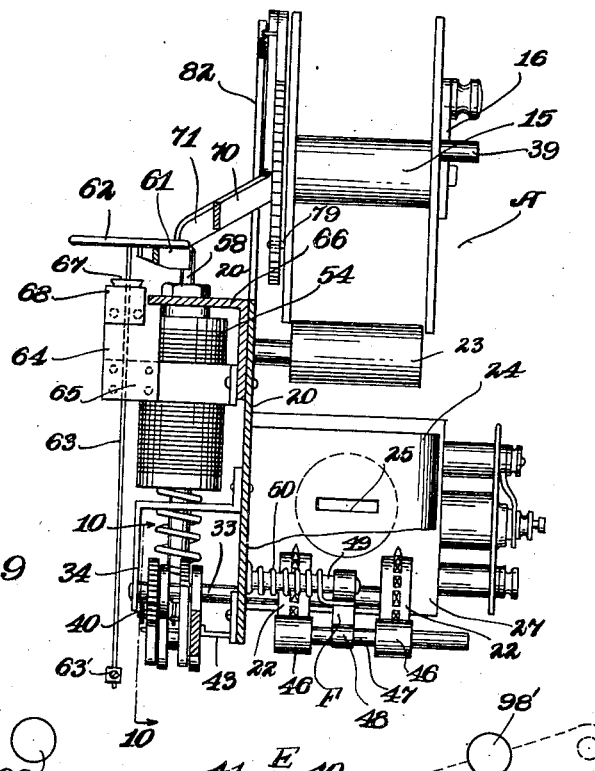
Figure 9 is a section on the line 9—9 of Figures 4 and 6.

The drawings illustrate my electrical unit A which is designed to be attached to the projecting cabinet B by means of a latch C so that the unit A may be replaced by a similar unit at any time, the operation of the replacing of the same being a matter of only a few moments, thus providing an indicator which is serviceable at all times should there be any occasion to change the entire indicating unit A. The electrical indicator unit A constitutes parts which co-operate together and which have been designed to virtually obviate the necessity of replacement owing to the simple effective structure, excepting after a long period of time when the parts may become worn, however, each unit is provided with a master indicator in the form of a film which is carried on suitable supporting spools and the unit is so designed that this master indicating film may be removed and replaced by another indicating master film any time that it is desired.

The indicator A when attached to the projecting cabinet B is adapted to project the image from the master film 10 through the lenses 11 and 12 and to indicate the same in the desired size upon the screen 13 in the front of the projecting cabinet B. A number such as "215" is indicated on the screen 13 as it would appear in Figure 2. When the mechanism is operating to change from one number to another or from one indication to another, the screen 13 is blank. The screen is preferably of a translucent material when used in this manner where the indicator A projects the figure, number or symbol through the cabinet B. The same would be true if the indicator A operates against a screen without necessarily passing through a cabinet B or causing the image to be visible through the screen. The indicator A is provided with a pair of film receiving spools 14 and 15, which are removable by releasing either of the catches 16 which are held by the spring 17 in an annular groove 18 carried by the shafts 19. When the catch 16 is released, either of the spools 14 or 15 can be slipped off of the shafts 19. Each spool 14 and 15 is of the same general structure and nature and the catch member 16 for each one is identical. The spools 14 and 15 which hold the film 10 are supported by the side plate 20 of the unit A and are adapted to hold the film 10 so that it can be projected over the roller 21, the sprockets 22 and over the roller 23. The rollers 21 and 23, together with the sprockets 22 are supported from the side plate 20 and the unit A is open on one side opposite to the side plate 20 so as to permit the free threading of the film over the rollers and sprockets. Handles upon the levers 16 may be used to wind the film quickly one way or another, or a separate pair of handles 39 may be formed on the spools 14 and 15 for this purpose, so that the film may be wound manually when desired.

I provide a guide 24 above the sprockets 22 which is adapted to receive the film 10 between the sides of the same and this guide is formed with a slot 25 so as to mask out a portion of the film and permit the remainder to be projected through the slot 25 and through the lens 12 and into the cabinet B so as to illuminate the portion which is not masked out by the guide 24 on the screen 13.

The indicator A is provided with an illuminating compartment 26 which is secured to the side wall 20 and which is formed with a side cover 27 adapted to support an illuminating lamp 28 on the inside of the cover 27 and formed with switch plugs 29 which fit into the sockets 30 supported within the compartment 26. The compartment 26 is provided with suitable openings 31 to dispense with the heat from the lamp 28 within the compartment 26 and this compartment also supports the lens 11 on the front of the same. The peculiar construction of my lamp compartment 26 is such that the cover 27 may be quickly removed to place another lamp 28 within the same, if it is desired, by a similar cover being set in place which holds another illuminating lamp 28. This permits the changing of the light 28 quickly and readily without disturbing the other parts of the machine and the compartment 26 is thus constructed in a manner so that when the lamp 28 is contained within the compartment the major portion of the light is directed through the lens 11 and against the portion of the film exposed through the slot 25 so that the lens 12 may project the light on to the screen. This sends a sufficiently strong ray of light from the lamp 28 through the slot 25 to clearly indicate the configuration or number appearing on the master 10 on the screen 13. The film 10 is formed with marginal openings 32 which are adapted to be engaged by the teeth of the sprocket wheels 22 so as to move the film when it is desired. The sprocket wheels 22 are mounted upon the shaft 33 which extend through the side plate 20 and the outer end of which is supported by the bracket member 34 projecting down from the outside of the plate 20 as indicated in Figure 9. Between the bracket 34 and the plate 20 I provide a ratchet mechanism E which is designed with a pair of ratchet arms 35 and 36 which carry the spring urged operating pawls 37 and 38, respectively. The ratchet mechanism E is adapted to operate the ratchet wheels 40 and 41 which are mounted upon the shaft 33 adjacent each other and the teeth of which are oppositely disposed so that by operating the lever 35 the shaft 33 will be rotated in one direction by the pawl 37 engaging with the teeth of the ratchet wheel 40, whereas, when the lever 36 is operated the pawl 38 will engage the teeth of the wheel 41 and operate the shaft 33 in the opposite direction. Thus, the ratchet lever 35 operates the shaft in one direction and the lever 36 in the opposite direction.

Figure 10:
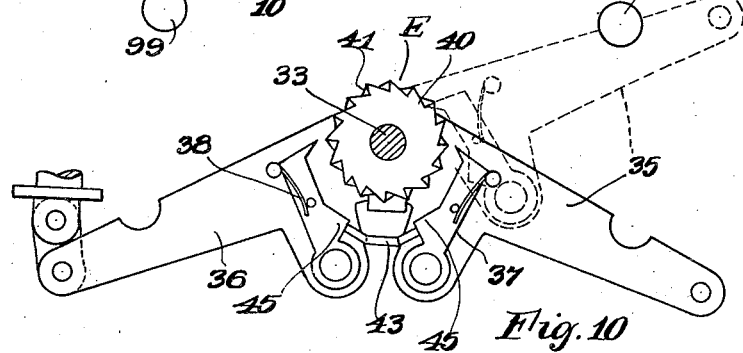
Figure 10 is an enlarged detail sectional view on the line 10—10 of Figure 9.
Figure 11:
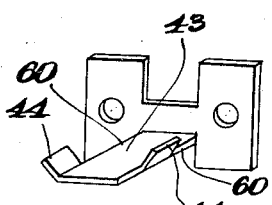
Figure 11 is a perspective of the stop portion of the ratchet operating mechanism of Figure 10.

When the levers 35 and 36 are in their normal inoperative position they depend as illustrated in Figure 4, or diagrammatically illustrated in Figure 10 in full lines, and the pawls 37 and 38 are held out of engagement with the ratchet wheels 40 and 41 by the stop 43 which projects between the pawls 37 and 38 and is formed with shoulders 44 which engage against the projecting portions 45 formed on each of the pawls 37 and 38. Thus, the ratchet mechanism E is held normally out of engagement with the ratchet wheels 40 and 41 and I provide an automatic registering means F for the master film 10 so as to cause the same to always register in proper relation to the slot 25. This registering means F includes a pair of rollers 46 carried upon the shaft 47 which is held by the arm 48 pivotally supported from the shaft 49. A suitable coil spring 50 about the shaft 49 holds the arm 48 with the rollers 46 pressing toward the teeth of the sprocket wheels 22. This automatic registering means F operates by the spring 50 to place a slight tension between and against the teeth of the sprockets 22. In this manner the sprockets 22 are always brought to rest or stopped in the proper position to register the numbers such as 52 in proper relation to register correctly with the slot 25. The numbers 52 are placed upon the master film 10 uniformly spaced in relation to the openings 32 and as the openings 32 engage with the teeth of the sprockets 22 by means of my automatic registering device F the master film is automatically caused to stop in proper register with the opening 25. This automatic registering device F prevents any possibility of the master film not registering in position to clearly and wholly indicate the number or signal on the screen 13, and it also overcomes undesirable inertia in the rapid movement of the master film 10 from one position to another by the operating ratchet mechanism E. The automatic registering means F does not undesirably retard the free movement of the film 10 to the desired position, and the shaft 47 is extended to form a handle by which the rollers 46 may be held out of contact with the sprockets 22 for manual winding or insertion of film.

The ratchet mechanism E is designed to be operated by a pair of electric solenoids 54 and 55, the solenoid 54 being connected by the link 56 to the arm 35 and the solenoid 55 being connected by the link 57 to the arm 36. To facilitate the quick operation of the armatures 58 of the solenoids 54 and 55 I provide springs 59 which urge the armatures to inoperative position. These springs quicken the operation of the solenoids 54 and 55 so as to permit rapid impulses to be carried out in the operation of my electrical indicator A.

The armatures 58 extend through the coils of the solenoids 54 and 55 and are limited in their downward movement by the arms 35 and 36 which strike the edges 60 of the stop 43. I provide a horizontally disposed member 61 projecting from the upper end of the armatures 58 which is adapted to engage freely under the disc parachute member 62. The parachute member 62 is supported on the upper end of the vertically disposed rod 63 which is slidably supported in the insulating block 64 held by the bracket members 65 projecting out from the side plate 20 between the solenoids 54 and 55. The solenoids 54 and 55 are supported by a singular bracket 66 which projects out from the side plate 20. The rod 63 carries a switch washer 67 which engages with the switch points 68 which close the circuit to the lamp 28 when the rod 63 is in its dropped position, as illustrated in Figure 4, the electrical circuit of which will be hereinafter more clearly described.

The upper ends of the armatures 58 are adapted to engage the free ends 69 of the levers or bars 70 and 71 which are pivotally connected at 72 and 73, respectively. The levers 70 and 71 are similar, there being one for each spool 14 and 15 of the indicator A, and each of the levers is provided with an offset member such as 74, the upper free end of which pivotally supports at 75 a spring urged ratchet dog 76. The ratchet dogs 76 are adapted to engage the teeth of the ratchet wheels 77 and 78, respectively which are attached to the spools 14 and 15 by means of pins 79 upon the spools so that the arms 70 and 71 may form balancing members and means for taking up the slack of the film 10 between the spools 14 and 15 in the operation of the film in either direction. Each ratchet dog 76 is formed with a cam end 80 which is caused to engage against a cam stop 81 when either of the levers 70 or 71 is moved in position to rotate the member 74 sufficiently to throw the cam ends 80 against either of the stops 81. The stops 81 may be formed on the bracket 82 which projects upward from the side 20 of the indicator A.

The operation of my electrical indicator is designed to quickly and accurately indicate a number such as 52, or any other suitable signal or sign which may be formed on the master film 10, to indicate on the screen 13 the desired signal or number. The operation is virtually silent, very rapid and accurate in clearly indicating a signal which may be made visible in the halls or rooms of a hospital, factory or building, or may be operable to indicate the signal, sign or number from a distance so that a large audience or gathering of people may clearly observe the signal indicated. In the operation of the electrical signal A the same is changed or operated to the desired position by electrical impulses which are automatically directed to move the master indicator into the desired position to indicate the signal. When current is directed to the solenoid 54 in a series of impulses the same will rapidly operate to operate the ratchet E to turn the film 10 in a direction to cause the film to be wound up on the spool or reel 15, while it is unwinding from the spool or reel 14. When the solenoid 55 is operated, the ratchet E may be operated to rotate the shaft 33 in a direction opposite to the operation of the solenoid 54 and direct the film to be wound up on the spool 14. At each impulse of either of the solenoids 54 or 55 the rod 63 is elevated by the engagement of the arms 61 with the parachute disc 62. A suitable counter-weight which may be adjusted as to size, such as 63' is connected to the lower end of the rod 63. Then the closing of the switch for the light 28 is retarded by reason of the fact that the parachute disc 62 tends to prevent the rod 63 from dropping too rapidly so that if several impulses are to be carried out by either of the solenoids 54 the switch for the lamp 28 will not close until the solenoid is brought to rest. This is an important feature of applicant's electrical indicator because it permits the changing of the master film 10 from one position to the other while the screen 13 is blank and no numbers or signals may be seen passing on the screen, but rather the blanking out of the signal appearing and then the new signal appearing in a clear, sharp, visible nature.

In Figure 8 I have illustrated a diagrammatic wiring diagram which will indicate the operation of my electrical signal A to more clearly define the operation thereof. In this wiring diagram a suitable transformer 84 is provided which is fed by the line current 85 and leading from the transformer the connector 86 extends to the lamp 28. From the lamp 28 the connector 87 extends to one of the points 68 for the switch which is closed by the washer switch member 67. From the other switch point 68 the wire 88 connects with the wire 89 which connects with the solenoid 55. The other side of the solenoid 55 is connected by the wire 90 to the dial 91 and the other side of the dial 91 is connected by the wire 92 which leads to the other side of the transformer. A second operating dial 93 may be provided which is connected to the wire 92 by the wire 94 and on the other side is connected by the wire 95 to the solenoid 54, while the solenoid 54 is connected by the wire 96 to the other side of the transformer. The operating dials 91 and 93 are of a similar nature as are used in automatic telephones wherein a make and break switch is provided so that if either of the dials 91 or 93 are operated a suitable number of impulses may be directed through the lines with which they are connected. The dial 91 operates the solenoid 55, while the dial 93 operates the solenoid 54. Obviously one dial may be provided in place of both of the dials 91 and 93 and a suitable switch arranged so that the impulses may be directed either to the solenoid 54 or 55 from a single operating dial. This would simply be a matter of connecting a proper switch in the circuit so as to direct the impulses either to the solenoid 54 or 55. It may be preferred to use separate dials for each of the solenoids 54 or 55 and thus one could be used to add and the other to subtract where indicating numbers are used such as are illustrated on the master film 10. It is also obvious that any other make and break switch means may be employed to operate the solenoids 54 and 55, the primary feature in the operation of my electrical indicator A being to direct a series of impulses to the solenoids so that in operation the solenoids will operate the ratchet E to move the master indicator 10 in either direction. Suitable switches 97, or lock switches such as 98 may be used on the indicator A or near the dials 91 and 93 to lock the mechanism or turn off the lamp or armature current.

In operation the film or master 10 may become slack on one side or the other of the spools or reels 14 and 15, particularly when short moves of the master are made and where the inertia of the operation may cause either of the spools 14 or 15 to move a little too far. This does not affect the registry owing to the automatic registering means F but if the film or master 10 slackens between the rolls or spools 14 and 15 it will be automatically adjusted by means of the balancing arms 70 and 71 together with the ratchet mechanism of the dogs 76. For instance, this is accomplished in the following manner: Each spool 14 and 15 winds the film on to the same in counter-clockwise direction. When electrical impulses are directed through the solenoid 54 the solenoid operates its armature 58 which lifts the lever 35, causing the ratchet pawl 37 to engage the left wheel 41 turning the shaft 33 in a direction to unwind the film 10 from the spool 14. A suitable stop 98' limits the movement of the arm 35 when pulled upward by the solenoid 54. A stop 99 is also provided which limits the upward movement of the arm 36 in the same manner as the stop 98' acts in conjunction with the arm 35. As the impulses are directed to the solenoid 54 the ratchet mechanism E will continue to rotate the shaft 33 in the direction to cause the film 10 to move the desired distance so as to show the proper number 52 on the screen 13. If the unwinding continues sufficient off of the spool 14 the ratchet dog 76 will be carried over sufficiently to raise the balancing arm 71 over to a position to cause the cam end 80 to engage against the stop 81 and thereby automatically release the ratchet dog 76 and permit more film to be unwound from the spool 14. As the armature 58 raises and lowers rapidly it will operate against the free end 69 of the arm 70 and cause the ratchet dog 76 of the arm 70 to engage the teeth 77 and wind up the film on the spool 15.

Thus as the film is unwound from the spool 14 it is automatically wound up on the spool 15. This continues in the operation of the solenoid 54 as electrical impulses are passed through the same and at each impulse the armature 58 lifts up the switch washer 67 and if there are a number of consecutive impulses they are so rapid that the switch washer 67 will not close against the point 68 until the impulses stop. If the film 10 slackens from either the spool 14 or 15 the slack will be taken up by the weight of the balancing arms 70 and 71, the free ends of which will drop down towards the upper ends of the armatures 58. If the slackness is too great to be taken up by the movement of the free end 69 of either of the arms 70 and 71 dropping down, then the slackness will be taken up as soon as the impulses in the solenoid have operated sufficiently to draw the film on to the spool in the direction in which the ratchet mechanism E is operating to wind the film either on the spool 14 or 15. When the pull on the film on either of the spools 14 or 15 becomes so great as to lift either of the balancing arms 70 and 71 up above the ends of the armature 58, such as the position of the arm 71 in Figure 15, then the ratchet dog 76 carried by the end 74 of the arm 71 will be moved into position to automatically engage the stop 81 and release the ratchet dog 76, permitting the film to unwind off of the spool 14. The moment the tension is released on the film roll from the spool 14, the balancing arm 71 will drop and the dog 76 will engage the teeth 78 to take up the slack of the film by the balance of the arm 71.

The operation of the solenoid 55 operates to unwind the film from the spool 15 and to wind up the film on the spool 14. The quick operation of the solenoid 55 causes the ratchet dog 76 to engage over the teeth for the spool on which the film is being wound and wind up the film as it is unwound from the other spool. The operation of each of the solenoids 54 and 55, together with their complemental ratchet mechanism E is identical and is adapted to be operated by electrical impulses coming through from either of the switches 91 or 93, and it should be borne in mind that each time an impulse is directed into either of the solenoids the illuminating lamp 28 is instantly cut off by the movement of the switch collar 67. This is important because it keeps the screen 13 blank until the number is reached which it is desired to project upon the screen to provide the desired signal.

Figure 12 illustrates the solenoid 54 operating to operate the arm 35 to unwind the film from the reel 14. This figure shows the armature 58 raised which also raises the switch washer 67 and the arm 70. Figure 13 illustrates the uppermost movement of the armature 58. Figure 14 illustrates next position of the armature 58 of the solenoid 54 as it drops after the position of Figure 13 and shows the switch collar 67 still elevated but traveling downward being retarded by its parachute disc 62. The balancing arm 70 is held upward in its balancing position to wind up the film on the spool 15. Figure 15 shows another illustration of my electric indicating device A wherein the film is being unwound from the spool 14 toward the spool 15, and the balancing arm 71 has been elevated in the position so that the dog 76 is released by the stop 81. This position illustrates the release of the film on the spool 14 so that it may unwind toward the spool 15.

The parts of my electrical indicator A have been carefully designed to cause them to function together automatically and to overcome any undue strain or tension on the master film such as 10, and to permit the operation of the same with a small amount of energy and held so that the film may move rapidly in either direction, and thus I am able to provide a master indicating means such as the numerals 52 on the film 10 which may permit signalling by these numerals, each numeral indicating a signal, a score, or an indicator to provide virtually a silent call means adaptable for the purposes set forth. It is apparent that any configuration or signal or sign may appear in the master film 10. Whatever the signal is it will be indicated when the film is stopped and the signal registers with the opening 25 to display the signal on the screen 13. The automatic registering means F insures the proper registry no matter to what position the master 10 has been moved owing to the positioning of the signals 52, and any variation in the film or its movement is properly taken care of in the automatic registering means F in a simple manner to indicate the signal on the screen 13.

The unit A is provided with an electrical plug G from which the cable of wires 100 extend, only a portion of the cable being illustrated in the drawings. The cable 100 carries the wires to the solenoids 54 and 55, switch points 68, and the lamp 28. This plug G is formed with connectors 101 which make the proper electrical connections to the transformer 84 and the line current 85, together with the operating switches 91 and 93. The idea of this plug is to permit the disconnection of the entire unit A from the cabinet B, keeping all of the wiring of the unit carried in the cable 100 to the plug G and permitting the connectors 101 to make the proper electrical connections.

The illuminating compartment 26 may also be formed as illustrated in Figure 18. In this modification, the socket 103 of the bulb 28 is inserted through the side plate 20 and is attached to the same. To permit easy changing of bulbs 28, the entire compartment 26 may be removable from spring clips or brackets 104 attached to the side plate 20. If this is not desirable the front portion of the compartment 26 containing the lens 11 may be attached directly to the side plate 20 and the top, bottom, side and back portion 105 may be held removable by the clips 104. In Figure 18 I have also illustrated a reflector 106 which may be used in connection with the bulb 28 if necessary or desirable.

I believe my electrical indicator is of a nature to accomplish certain results to provide a silent call, a signalling means which may be used in factories or other buildings, as well as in hospitals, or for indicating the position of elevators in buildings, or for the purpose of indicating scores and other purposes where a signal is desired having a nature to accomplish the results set forth and wherein a master may be employed of a considerable length but held operable with the unit means in a small, compact space, economically operated with interchangeable parts and replaceable as a whole unit when desired. It is also apparent that as many of the units A as may be desired may be employed either singularly or in a battery of units, or a plurality of these units may be operated either together or singularly for the purpose of providing an automatic electrical indicator. The silent call provided by my device presents a structure which is simpler to install or repair, and which is economical, in that but relatively few wires are needed in order to produce even a far greater range of numbers or signals than has been heretofore practical. Thus my device may be readily installed in buildings where high cost and unsightly cables would prevent the insertion of silent call signals of other types. My indicator provides the projection by electrical impulses of selective signals or scores, the automatic blanking out during the period of impulses until the changing operation has been complete, the ratchet take-up mechanism with counter-weight or spools operable in either direction, the retarding of the light opening switch which is held freely slidable and rotatable in its guide block which is operable by a series of adjacently disposed solenoids, together with the automatic registering means which overcomes the inertia in the movement of the master film and causes positive register at the instant of stopping of the movement of the master indicator, all of which features, together with other advantages have been set forth to provide an indicator of a very desirable nature.

In accordance with the patent statutes I have described the principles of operation of my electrical indicator and while I have endeavored to set forth the best embodiment thereof, I desire to have it understood that the illustrations are only suggestive of the best arrangement of the parts and the functions of the same and that obvious changes and adaptations may be employed within the scope of the following claims.

I claim:

1. An electric signal indicator including a strip of film, a reel supporting means for each end of said film to which the film is attached, a sprocket engaging said film to move the same in either direction, a sprocket shaft, a solenoid, ratchet means on said sprocket shaft operated by said solenoid for moving said film in one direction, a second solenoid, means operated by said second solenoid for moving said film in the opposite direction, a circuit for each of said solenoids, and means for selectively energizing said solenoids.

2. An electrical signal including a pair of reels, a film having one end secured to one reel and the other end secured to the other reel, means engaging said film intermediate said reels to move said film a predetermined distance, a shaft for said film engaging means, a double acting ratchet means, means sensitive to electrical impulses for operating said ratchet for operating said film moving means in either direction, and means for providing a series of electrical impulses for said impulse sensitive means.

3. An electrical signal indicator including a film, a reel supporting means for each end of said film to which the film is attached, a sprocket engaging said film to move the same a predetermined distance in one direction, a solenoid, means operated thereby for operating said sprocket, a second solenoid, means operated thereby for operating said sprocket in the opposite direction, a circuit to each of said solenoids, a means for producing a series of consecutive impulses, and means for operatively connecting said last named means selectively to said solenoids to energize the same.

4. An electrical signal including a film, a series of indications on said film, means engaging said film to move said film, means operating said film engaging means selectively to display consecutive or non-consecutive portions of said film, switch means operated by said means operating said film engaging means, and electrical illuminating means controlled by said switch means, means including said film operating means for opening said switch means throughout a film moving operation.

5. An electrical signal including a display having a series of indications thereon, means engaging said display to move the same to display adjacent or non-adjacent portions thereof, an illuminating means for said display, a circuit to said illuminating means, a switch in said circuit, and means for operating said display engaging means and said switch to open said switch throughout the length of operation of said display engaging means.

6. An electrical display including a display film, means engaging said film to move said film, solenoid means for operating said film engaging means, an illuminating means for said film, a circuit to said illuminating means, and means including said solenoid for switching out the lamp during movement of said film.

7. An electrical display device comprising, a master display film, means for supporting and guiding said film, means for moving said film a step at a time in either direction by electrical impulses, illuminating means, means including said film moving means for turning off said illuminating means during every movement of said master film, said last named means including means for retarding the turning on of said illuminating means.

8. An electrical display device including a film, a series of indicia on said film, means for supporting said film, an illuminating means for said film, means for moving said film a step at a time in either direction, and means including said film moving means for switching out said illuminating means during movement of said film.

9. An electrical projecting indicator including illuminating means, masking means in advance of said illuminating means, an indicator movably mounted adjacent said masking means so that all but one portion of the indicator is masked out, a sprocket engaging said indicator to move the same a step at a time, means for operating said sprocket to move said indicator, and roller means resiliently mounted adjacent said sprocket and engageable between the teeth of said sprocket for automatically registering said indicator with respect to said masking means.

10. An electrical indicator including a film, film masking means therefor, a sprocket engaging said film to move the same, and registering means for stopping movement of said film and registering said film with said film masking means including a roller engageable with the teeth of said sprocket, resilient means for mounting said roller in engagement with said sprocket, and engageable between the teeth of said sprocket to accurately frame an indicating portion of the film with respect to the masking means.

11. A film projector unit including, an electrically operated selective means for moving the film in one direction or the other in the projector to select for projection any portion thereof, said means including a sprocket for engaging said film to move the same, film masking means, roller means engageable between the teeth of said sprocket, resilient means for mounting said roller in engagement with the teeth of the sprocket to accurately frame an indicating portion of the film with respect to the masking means.

12. In combination with the illuminating circuit of a film projector, a film, means for moving said film in steps, means for actuating said film moving means to provide a single actuation or a series of consecutive actuations, a switch operated by said film moving means to open the illuminating circuit, and means for retarding the closing of said switch so that said switch cannot close the circuit between the consecutive actions of the series.

AUGUST J. KEMPIEN.